United States Patent
Biso et al.

(10) Patent No.: US 12,463,219 B2
(45) Date of Patent: Nov. 4, 2025

(54) COMPOSITION FOR SECONDARY BATTERY ELECTRODES

(71) Applicant: SYENSQO SPECIALTY POLYMERS ITALY S.P.A., Bollate (IT)

(72) Inventors: Maurizio Biso, Milan (IT); Paula Cojocaru, Legnano (IT)

(73) Assignee: SYENSQO SPECIALTY POLYMERS ITALY S.P.A., Bollate (IT)

(*) Notice: Subject to any disclaimer, the term of this patent is extended or adjusted under 35 U.S.C. 154(b) by 751 days.

(21) Appl. No.: 17/618,905

(22) PCT Filed: Jun. 29, 2020

(86) PCT No.: PCT/EP2020/068253
§ 371 (c)(1),
(2) Date: Dec. 14, 2021

(87) PCT Pub. No.: WO2021/001315
PCT Pub. Date: Jan. 7, 2021

(65) Prior Publication Data
US 2022/0311005 A1  Sep. 29, 2022

(30) Foreign Application Priority Data
Jul. 1, 2019 (EP) .................................... 19183739

(51) Int. Cl.
| | | |
|---|---|---|
| *H01M 4/62* | (2006.01) | |
| *C08G 73/14* | (2006.01) | |
| *H01M 4/02* | (2006.01) | |
| *H01M 4/131* | (2010.01) | |
| *H01M 4/133* | (2010.01) | |
| *H01M 4/134* | (2010.01) | |

(52) U.S. Cl.
CPC ............ *H01M 4/623* (2013.01); *C08G 73/14* (2013.01); *H01M 2004/027* (2013.01); *H01M 2004/028* (2013.01); *H01M 4/131* (2013.01); *H01M 4/133* (2013.01); *H01M 4/134* (2013.01)

(58) Field of Classification Search
CPC .............................. H01M 4/622; H01M 4/623
See application file for complete search history.

(56) References Cited

U.S. PATENT DOCUMENTS

| | | | | |
|---|---|---|---|---|
| 6,433,996 B1 * | 8/2002 | Hata | ..................... | H01M 4/621 29/25.03 |
| 2014/0356706 A1 | 12/2014 | Sasaki et al. | | |
| 2015/0140424 A1 | 5/2015 | Ma et al. | | |

FOREIGN PATENT DOCUMENTS

JP        2004335188 A      11/2004

* cited by examiner

*Primary Examiner* — Maria Laios
*Assistant Examiner* — Jordan E Berresford
(74) *Attorney, Agent, or Firm* — Osha Bergman Watanabe & Burton LLP

(57) ABSTRACT

The present invention pertains to an electrode-forming composition comprising one or more aromatic polyamide-imide polymers (PAI), one or more electro-active compounds, one or more solvents and one or more co-binder materials being selected among polymers having a Tg below 30° C. and having an enthalpy of fusion from 0 to 90 J/g. The present invention also relates to the use of said electrode-forming composition in a process for the manufacture of an electrode, to said electrode and to an electrochemical device such as a secondary battery comprising said electrode.

13 Claims, No Drawings

COMPOSITION FOR SECONDARY BATTERY ELECTRODES

This application is a U.S. national stage entry under 35 U.S.C. § 371 of international patent application No. PCT/EP2020/068253 filed on Jun. 29, 2020, which claims priority to EP Application No. 19183739.2, filed on Jul. 1, 2019, the whole content of this application being explicitly incorporated herein by reference.

TECHNICAL FIELD

The present invention pertains to electrode-forming compositions, to the use of said electrode-forming compositions in a process for the manufacture of electrodes, to said electrodes and to electrochemical devices such as secondary batteries comprising said electrodes.

BACKGROUND ART

Electrochemical devices such as secondary batteries typically comprise a positive electrode, a negative electrode, a separator and an electrolyte.

Electrodes for secondary batteries are usually produced by applying an electrode forming composition onto a metal substrate also known as "current collector". The electrode forming compositions are typically formed by mixing a binder with a powdery electro active compound and optionally other ingredients such as solvents, materials to enhance conductivity and/or control viscosity. The binder is a key component of electrodes because it must ensure good adhesion to the current collector and to the electro active compounds, thus allowing the electro active material to transfer electrons as required. Current commercial batteries typically use graphite as electro active compound in the anode, and mixed oxides containing nickel and lithium as electro active compounds in the cathode. The electrode forming composition is typically applied on the current collector and dried. The resulting sheet is normally calendered or otherwise mechanically treated and rolled. Individual electrodes are then cut out from this sheet.

Among binders, aromatic polyamide-imide (PAI) polymers have interesting properties when used in both positive and negative electrodes. In particular, PAI polymers, when used in the cathode, show a stronger adhesion to the current collector than commonly used fluoropolymers. When used in the anode, PAI polymers can be incorporated using an aqueous process which reduces significantly the usage of organic solvents in battery manufacturing, and at the same time have good adhesion to certain electro active materials such as silicon containing electro active materials which are very difficult to bind using conventional binders for anodes (based on PVDF and/or SBR rubbers).

One factor that has so far limited the application of PAI polymers as binders is their relatively low flexibility. Flexibility is important for electrode forming compositions because, depending on the design of the battery, during manufacturing the electrodes can be folded or rolled, finished batteries can also be subject to mechanical stresses when in use. Moreover some electrode compositions can incur in volume changes when charging/discharging the battery which can cause mechanical stresses within the electrode material. Graphite anodes enriched with silicon containing electro active compounds have attracted tremendous interest due to their ability to incorporate a larger lithium concentration, which can provide a much higher energy capacity. A drawback of these anode design is that the particles of silicone containing electro active compounds suffer from an extremely large volume change that occurs during charge/discharge of the battery, due to lithium alloying. This volume change can cause a strong mechanical stress at the interface between the electro active material and the binder.

When subject to mechanical stresses, electrode forming compositions which are not flexible enough may detach form the current collector or form discontinuities or fractures within the electrode structure e.g. reducing the continuity of the structure around the electro active materials, thus reducing the efficiency of the battery overall. For example, it may cause severe pulverization and break electrical contact between Si particles and carbon conducting agents. It may also cause unstable solid electrolyte interphase (SEI) formation, resulting in degradation of electrodes and rapid capacity fading, especially at high current densities.

There is still a need in the art for an electrode forming composition which uses PAI polymers as binders and which is able to withstand the mechanical stresses which occur during electrode manufacturing as well as those occurring during usage and caused by volume expansion and contraction of the electrode materials, in particular in anodes comprising silicone containing electro active materials, during charging and discharging cycles. The present invention addresses this need by providing a new electrode forming composition which comprises PAI polymers and which is able to withstand mechanical stresses and at the same time shows a surprising adhesion performance when used both in cathodes and in anodes.

SUMMARY OF INVENTION

The present invention relates to an electrode forming composition comprising:
(i) one or more aromatic polyamide-imide (PAI) polymers comprising more than 50% by moles of recurring units $R_{PAI}$ each of said $R_{PAI}$ recurring units comprising
 at least one aromatic ring,
 at least one imide group as such or in its amic acid form or as a salt of its amic acid form
 at least one amide group which is not included in the amic acid form of an imide group;
(ii) one or more electro-active compounds;
(iii) one or more solvents;
(iv) one or more co-binder materials, being selected among polymers having a Tg below 30° C. and having an enthalpy of fusion from 0 to 90 J/g.

The electrode-forming composition (C) of the present invention is particularly suitable for the manufacturing of composite negative electrodes, preferably of silicon containing negative composite electrodes for electrochemical devices.

In a further aspect the present invention relates to a process for the manufacture of an electrode using an electrode forming composition as described.

In a further aspect the present invention relates to an electrode obtainable from such a process.

In a further aspect the present invention relates to an electrochemical device comprising said electrode.

DESCRIPTION OF EMBODIMENTS

As known in the art, an electrode forming composition is a composition of matter, typically a fluid composition, wherein solid components are dissolved or dispersed in a liquid, which can be applied onto a metallic substrate and subsequently dried thus forming an electrode wherein the metallic substrate acts as current collector. Electrode forming compositions typically comprise at least an electro active material and at least a binder.

The Binder

The electrode forming composition of the present invention comprises one or more aromatic polyamide-imide (PAI) polymers which function as a binder. The term "aromatic polyamide-imide polymer" is intended to denote any polymer comprising more than 50% by moles of recurring units $R_{PAI}$, said units $R_{PAI}$ comprising at least one aromatic ring, at least one imide group (as such, in its amic acid form, or as a salt of its amic acid form), and at least one amide group which is not included in the amic acid form of an imide group. Preferably the PAI polymer of the invention has a number average molecular weight comprised between 2000 and 10000 Daltons.

The recurring units ($R_{PAI}$) are preferably selected from the group consisting of units of any of general formulae ($R_{PAI}$-a) ($R_{PAI}$-b) and ($R_{PAI}$-c):

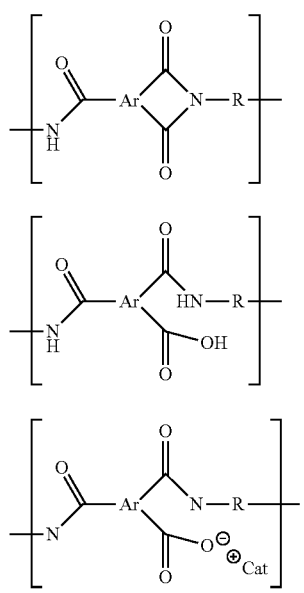

wherein:

Ar is a trivalent aromatic group; preferably Ar is selected from the group consisting of the following structures:

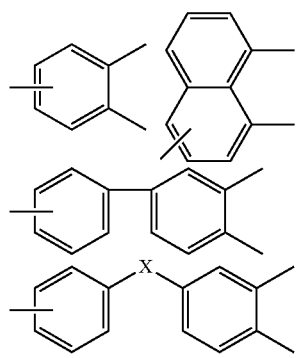

and corresponding optionally substituted structures, wherein X is selected from the group consisting of —O—, —C(O)—, —CH$_2$—, —C(CF$_3$)$_2$—, —(CF$_2$)$_n$—, with n being an integer from 1 to 5,

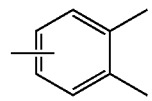

more preferably Ar is:

R is a divalent aromatic group; preferably R is selected from the group consisting of the following structures:

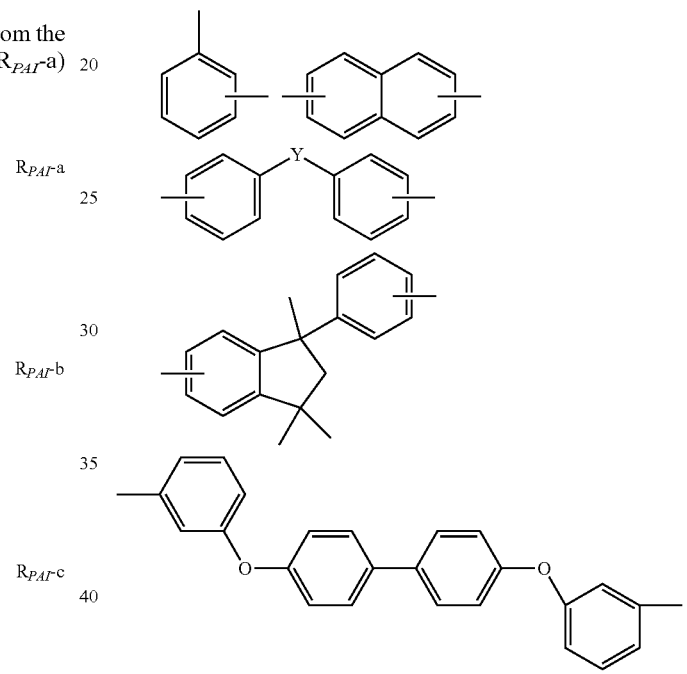

and corresponding optionally substituted structures, wherein with Y is selected from the group consisting of —O—, —S—, —SO$_2$—, —CH$_2$—, —C(O)—, —C(CF$_3$)$_2$—, —(CF$_2$)$_p$—, "p" being an integer from 0 to 5, more preferably R is:

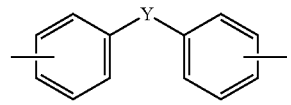

"Cat+" is a monovalent cation preferably selected from alkali metals cations, protonated primary secondary or tertiary ammonium cations, and quaternary ammonium cations, more preferably is selected from Na$^+$, K+ and Li$^+$, even more preferably is Li$^+$.

To note, in all formulae, the floating bond indicates that the substituent can be bonded to either of the closest carbons to the floating bond on the ring. In other words,

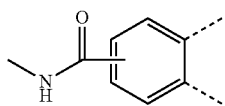

in each formula represents both:

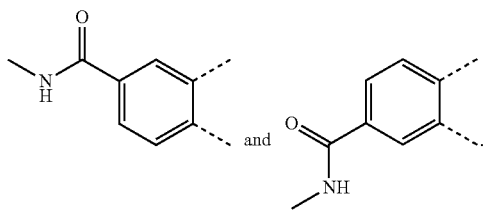

Recurring units ($R_{PAI}$) are preferably selected from recurring units (I), (m) and (n), in their amide-imide ($R_{PAI}$-a), amide-amic acid ($R_{PAI}$-b) or amide, amic acid salt ($R_{PAI}$-c) forms. Recurring units (I), (m) and (n) are represented here below for conciseness only in their amide-imide form ($R_{PAI}$-a), the other forms ($R_{PAI}$-b) and ($R_{PAI}$-c) being easily derivable for the skilled person:

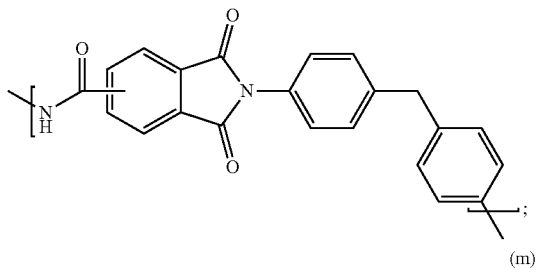

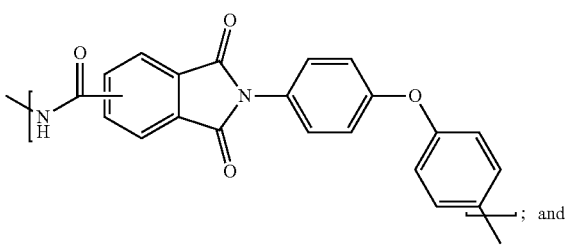

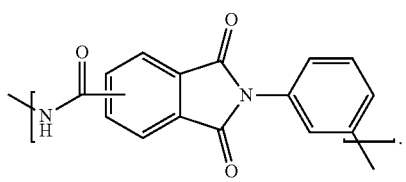

Most preferably, the polymer (PAI) comprises more than 90% by moles of recurring units ($R_{PAI}$). Still more preferably, it contains no recurring unit other than recurring units ($R_{PAI}$).

When the composition of the invention is an anode forming composition it is preferred that in the PAI polymer $R_{PAI}$-a units represent 0-50%, preferably 0-10%, $R_{PAI}$-b units represent 0-50%, preferably 0-10%, and $R_{PAI}$-c units represent 50-100%, preferably 80-100% in moles of the total $R_{PAI}$ recurring units.

When the composition of the invention is a cathode forming composition it is preferred that in the PAI polymer $R_{PAI}$-a units represent 50-100%, preferably 80-100%, $R_{PAI}$-b units represent 0-50%, preferably 0-10%, and $R_{PAI}$-c units represent 0-50%, preferably 0-10% in moles of the total $R_{PAI}$ recurring units.

Polymers (PAI) are notably commercialized by Solvay Specialty Polymers USA, L.L.C. under the trademark name TORLON®.

The CO-Binder

The electrode forming compositions of the invention also comprise one or more co-binder materials. The function of the co-binder(s) is to impart flexibility to the finished electrode and to increase adhesion of the composition to the current collector and to the electro active compound. These two effects in combination provide the electrodes of the invention with an increased resistance to mechanical stresses which allow the use of these PAI based electrodes in many battery configurations where a PAI based electrode composition without the co-binder would lead to fractures or detachments of the electrode composition from the current collector or the electro active compound.

The co-binder(s) for the present invention are selected among polymers having a Tg (as measured via DSC) below +30° C., preferably between −50° C. and +20° C., more preferably comprised between −40° C. and 0° C., and having an enthalpy of fusion (as measured via DSC) from 0 to 90 J/g, preferably from 0 to 50 J/g, more preferably from 0 to 30 J/g.

Preferably co-binders materials are selected from fuoroelastomers and/or SBR rubbers.

In another embodiment when the composition comprises fluoroelastomers as co-binder materials, the composition is free from SBR rubbers.

Fluoroelastomers suitable for the present invention can be selected among partially and fully fluorinated fluoroelastomers having the Tg and enthalpy of fusion as defined above. The term "fluoroelastomer" is intended to designate a fluoropolymer resin serving as a base constituent for obtaining a true elastomer, said fluoropolymer resin comprising more than 10% wt, preferably more than 30% wt, of recurring units derived from at least one ethylenically unsaturated monomer comprising at least one fluorine atom (hereafter, fluorinated monomer) and, optionally, recurring units derived from at least one ethylenically unsaturated monomer free from fluorine atom (hereafter, hydrogenated monomer).

True elastomers are defined by the ASTM, Special Technical Bulletin, No. 184 standard as materials capable of being stretched, at room temperature, to twice their intrinsic length and which, once they have been released after holding them under tension for 5 minutes, return to within 10% of their initial length in the same time.

Generally fluoroelastomer comprises recurring units derived from at least one fluorinated monomer, wherein said fluorinated monomer is generally selected from the group consisting of:

$C_2$-$C_8$ fluoro- and/or perfluoroolefins, such as tetrafluoroethylene (TFE), hexafluoropropene (HFP), pentafluoropropylene, and hexafluoroisobutylene;

$C_2$-$C_8$ hydrogenated monofluoroolefins, such as vinyl fluoride; 1,2-difluoroethylene, vinylidene fluoride (VDF) and trifluoroethylene (TrFE);

(per)fluoroalkylethylenes complying with formula $CH_2=CH-R_{f0}$, in which $R_{f0}$ is a $C_1$-$C_6$ (per)fluoroalkyl or a $C_1$-$C_6$ (per)fluorooxyalkyl having one or more ether groups;

chloro- and/or bromo- and/or iodo-$C_2$-$C_6$ fluoroolefins, like chlorotrifluoroethylene (CTFE);

fluoroalkylvinylethers complying with formula $CF_2$=$CFOR_{f1}$ in which $R_{f1}$ is a $C_1$-$C_6$ fluoro- or perfluoroalkyl, e.g. —$CF_3$, —$C_2F_5$, —$C_3F_7$;

hydrofluoroalkylvinylethers complying with formula $CH_2$=$CFOR_{f1}$ in which $R_{f1}$ is a $C_1$-$C_6$ fluoro- or perfluoroalkyl, e.g. —$CF_3$, —$C_2F_5$, —$C_3F_7$;

fluoro-oxyalkylvinylethers complying with formula $CF_2$=$CFOX_0$, in which $X_0$ is a $C_1$-$C_{12}$ oxyalkyl, or a $C_1$-$C_{12}$ (per)fluorooxyalkyl having one or more ether groups; in particular (per)fluoro-methoxy-vinylethers complying with formula $CF_2$=$CFOCF_2OR_{f2}$ in which $R_{f2}$ is a $C_1$-$C_6$ fluoro- or perfluoroalkyl, e.g. —$CF_3$, —$C_2F_5$, —$C_3F_7$ or a $C_1$-$C_6$ (per)fluorooxyalkyl having one or more ether groups, like —$C_2F_5$—O—$CF_3$;

functional fluoro-alkylvinylethers complying with formula $CF_2$=$CFOY_0$, in which $Y_0$ is a $C_1$-$C_{12}$ alkyl or (per)fluoroalkyl, or a $C_1$-$C_{12}$ oxyalkyl or a $C_1$-$C_{12}$ (per)fluorooxyalkyl, said $Y_0$ group comprising a carboxylic or sulfonic acid group, in its acid, acid halide or salt form;

(per)fluorodioxoles, of formula:

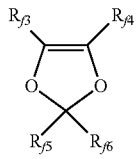

wherein each of $R_{f3}$, $R_{f4}$, $R_{f5}$, $R_{f6}$, equal to or different from each other, is independently a fluorine atom, a $C_1$-$C_6$ fluoro- or per(halo)fluoroalkyl, optionally comprising one or more oxygen atom, e.g. —$CF_3$, —$C_2F_5$, —$C_3F_7$, —$OCF_3$, —$OCF_2CF_2OCF_3$.

Examples of hydrogenated monomers are notably hydrogenated alpha-olefins, including ethylene, propylene, 1-butene, diene monomers, styrene monomers, alpha-olefins being typically used.

Fluoroelastomers are in general amorphous products or products having a low degree of crystallinity (crystalline phase less than 20% by volume).

The fluoroelastomers for use as co binders in the present invention are preferably selected among:
(1) VDF-based copolymers, in which VDF is copolymerized with at least one additional comonomer selected from the group consisting of:
(a) $C_2$-$C_8$ perfluoroolefins, such as tetrafluoroethylene (TFE), hexafluoropropylene (HFP);
(b) hydrogen-containing $C_2$-$C_8$ olefins, such as vinyl fluoride (VF), trifluoroethylene (TrFE), hexafluoroisobutene (HFIB), perfluoroalkyl ethylenes of formula $CH_2$=$CH$—$R_f$, wherein $R_f$ is a $C_1$-$C_6$ perfluoroalkyl group;
(c) $C_2$-$C_8$ fluoroolefins comprising at least one of iodine, chlorine and bromine, such as chlorotrifluoroethylene (CTFE);
(d) (per)fluoroalkylvinylethers (PAVE) of formula $CF_2$=$CFOR_f$, wherein $R_f$ is a $C_1$-$C_6$ (per)fluoroalkyl group, preferably $CF_3$, $C_2F_5$, $C_3F_7$;
(e) (per)fluoro-oxy-alkylvinylethers of formula $CF_2$=$CFOX$, wherein X is a $C_1$-$C_{12}$ ((per)fluoro)-oxyalkyl comprising catenary oxygen atoms, e.g. the perfluoro-2-propoxypropyl group;

(f) (per)fluorodioxoles having formula:

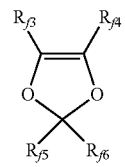

wherein each of $R_{f3}$, $R_{f4}$, $R_{f5}$, $R_{f6}$, equal to or different from each other, is independently selected from the group consisting of fluorine atom and $C_1$-$C_6$ (per)fluoroalkyl groups, optionally comprising one or more than one oxygen atom, such as notably —$CF_3$, —$C_2F_5$, —$C_3F_7$, —$OCF_3$, —$OCF_2CF_2OCF_3$; preferably, perfluorodioxoles;

(g) (per)fluoro-methoxy-vinylethers (MOVE, hereinafter) having formula: $CF_2$=$CFOCF_2OR_{f2}$
wherein $R_{f2}$ is selected from the group consisting of $C_1$-$C_6$ (per)fluoroalkyls; $C_5$-$C_6$ cyclic (per)fluoroalkyls; and $C_2$-$C_6$ (per)fluorooxyalkyls, comprising at least one catenary oxygen atom; $R_{f2}$ is preferably —$CF_2CF_3$ (MOVE1); —$CF_2CF_2OCF_3$ (MOVE2); or —$CF_3$ (MOVE3);

(h) $C_2$-$C_8$ non-fluorinated olefins (OI), for example ethylene and propylene; and (2) TFE-based copolymers, in which TFE is copolymerized with at least one additional comonomer selected from the group consisting of (c), (d), (e), (g), (h) and (i) as above detailed.

Particularly preferred fluoroelastomers are copolymers of VDF, TFE and HFP.

Optionally, fluoroelastomer for the present invention may also comprise recurring units derived from a bis-olefin [bis-olefin (OF)] having general formula:

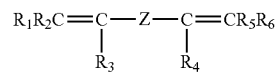

wherein $R_1$, $R_2$, $R_3$, $R_4$, $R_5$ and $R_6$, equal or different from each other, are H or $C_1$-$C_5$ alkyl; Z is a linear or branched $C_1$-$C_{18}$ (hydro)carbon radical (including alkylene or cycloalkylene radical), optionally containing oxygen atoms, preferably at least partially fluorinated, or a (per)fluoro(poly)oxyalkylene radical comprising one or more catenary ethereal bonds.

The bis-olefin (OF) is preferably selected from the group consisting of those complying with formulae (OF-1), (OF-2) and (OF-3):

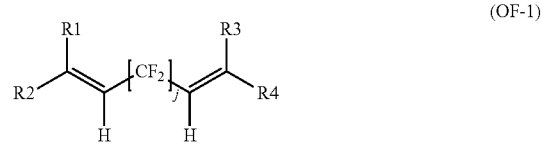

(OF-1)

wherein j is an integer between 2 and 10, preferably between 4 and 8, and R1, R2, R3, R4, equal or different from each other, are H, F or $C_{1-5}$ alkyl or (per)fluoroalkyl group;

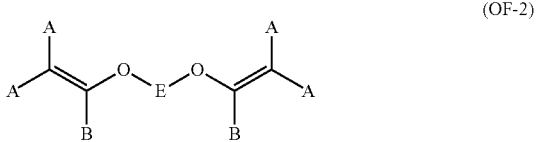
(OF-2)

wherein each of A, equal or different from each other and at each occurrence, is independently selected from F, Cl, and H; each of B, equal or different from each other and at each occurrence, is independently selected from F, Cl, H and $OR_B$, wherein $R_B$ is a branched or straight chain alkyl radical which can be partially, substantially or completely fluorinated or chlorinated; E is a divalent group having 2 to 10 carbon atom, optionally fluorinated, which may be inserted with ether linkages; preferably E is a —$(CF_2)_m$— group, with m being an integer from 3 to 5; a preferred bis-olefin of (OF-2) type is $F_2C=CF-O-(CF_2)_5-O-CF=CF_2$.

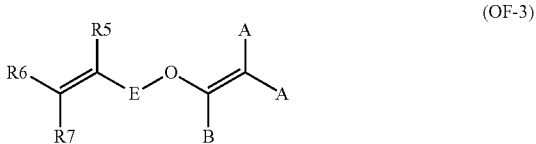
(OF-3)

wherein E, A and B have the same meaning as above defined; R5, R6, R7, equal or different from each other, are H, F or $C_{1-5}$ alkyl or (per)fluoroalkyl group.

Among specific compositions of fluoroelastomers suitable for the purpose of the invention, mention can be made of fluoroelastomers having the following compositions (in mol %):
(i) vinylidene fluoride (VDF) 35-85%, hexafluoropropene (HFP) 10-45%, tetrafluoroethylene (TFE) 0-30%, perfluoroalkyl vinyl ethers (PAVE) 0-15%, bis-olefin (OF) 0-5%;
(ii) vinylidene fluoride (VDF) 50-80%, perfluoroalkyl vinyl ethers (PAVE) 5-50%, tetrafluoroethylene (TFE) 0-20%, bis-olefin (OF) 0-5%;
(iii) vinylidene fluoride (VDF) 20-30%, $C_2$-$C_8$ non-fluorinated olefins (OI) 10-30%, hexafluoropropene (HFP) and/or perfluoroalkyl vinyl ethers (PAVE) 18-27%, tetrafluoroethylene (TFE) 10-30%, bis-olefin (OF) 0-5%;
(iv) tetrafluoroethylene (TFE) 50-80%, perfluoroalkyl vinyl ethers (PAVE) 20-50%, bis-olefin (OF) 0-5%;
(v) tetrafluoroethylene (TFE) 45-65%, $C_2$-$C_8$ non-fluorinated olefins (OI) 20-55%, vinylidene fluoride 0-30%, bis-olefin (OF) 0-5%;
(vi) tetrafluoroethylene (TFE) 32-60% mol %, $C_2$-$C_8$ non-fluorinated olefins (OI) 10-40%, perfluoroalkyl vinyl ethers (PAVE) 20-40%, fluorovinyl ethers (MOVE) 0-30%, bis-olefin (OF) 0-5%;
(vii) tetrafluoroethylene (TFE) 33-75%, perfluoroalkyl vinyl ethers (PAVE) 15-45%, vinylidene fluoride (VDF) 5-30%, hexafluoropropene HFP 0-30%, bis-olefin (OF) 0-5%;
(viii) vinylidene fluoride (VDF) 35-85%, fluorovinyl ethers (MOVE) 5-40%, perfluoroalkyl vinyl ethers (PAVE) 0-30%, tetrafluoroethylene (TFE) 0-40%, hexafluoropropene (HFP) 0-30%, bis-olefin (OF) 0-5%;
(ix) tetrafluoroethylene (TFE) 20-70%, fluorovinyl ethers (MOVE) 30-80%, perfluoroalkyl vinyl ethers (PAVE) 0-50%, bis-olefin (OF) 0-5%.

The fluoroelastomer can be prepared by any known method, such as emulsion or micro-emulsion polymerization, suspension or micro-suspension polymerization, bulk polymerization and solution polymerization.

Fluoroelastomers as defined above can preferably be introduced in electrode forming compositions for forming anodes according to the present invention as an aqueous suspension of finely divided particles with an average particle size as measured by Dynamic Light scattering according to ISO 22412 of preferably from 0.001 to 10 micrometers, more preferably of from 0.01 to 1 micrometers. The Fluoroelastomer suspension typically comprises from 10% to 50% by weight of the suspension before introduction of the suspension in the electrode forming composition of the invention.

In case of electrode forming compositions for forming cathodes according to the present invention, the fluoroelastomer can be dissolved or finely suspended in the solvent use to dissolve the PAI polymer. Preferred solvents are described below in the solvent section.

SBR rubbers suitable for the present invention are those which have the required Tg and enthalpy of fusion as described above. SBR rubbers are classified into two types: emulsion-polymerized SBR and solution-polymerized SBR and both types are suitable for the present invention. Examples of the emulsion-polymerized SBR include obtaining it as latex that may be dried and used as dry rubber. Examples of the solution-polymerized SBR include random SBR, block SBR, and symmetric block SBR, which have different types of copolymerization of styrene and butadiene. SBR also includes high styrene rubber, which has high compositional proportion of styrene and a high glass transition temperature (Tg). Further, SBR includes a modified SBR, which is copolymerized with an unsaturated carboxylic acid or an unsaturated nitrile compound. These types of SBR differ slightly from one another in physical properties (e.g., adhesion property, strength and thermal property), which difference is attributed to the copolymerization type and the styrene/butadiene copolymerization ratio. The type of SBR employed in the preparation of the electrode forming composition of the present invention can be appropriately selected in accordance with the type of electrode active material to be employed for the preparation of electrodes.

Among the aforementioned types of SBR, an aqueous suspension prepared by dispersing emulsion- or solution-polymerized SBR in water is suitable for use in the preparation of the electrode forming composition of the present invention when forming a negative electrode.

The average particle size of SBR employed in the aqueous suspension of SBR of the present invention is preferably comprised in the range from 0.01 to 1 micrometers as measured by Dynamic Light scattering according to ISO 22412.

The SBR suspension typically comprises from 30% to 60% by weight of SBR in water suspension before introduction of the suspension in the electrode forming composition of the invention.

Electro-Active Compound

The electrode forming compositions of the present invention include one or more electro-active compounds. For the purpose of the present invention, the term "electro-active compound" is intended to denote a compound which is able to incorporate or insert into its structure and substantially release therefrom alkaline or alkaline-earth metal ions during the charging phase and the discharging phase of an electrochemical device. The electro active compound is preferably able to incorporate or insert and release lithium ions.

The nature of the electro active compound in the electrode forming composition of the invention depends on whether said composition is used in the manufacture of a positive electrode (cathode) or a negative electrode (anode).

In the case of forming a positive electrode for a Lithium-ion secondary battery, the electro active compound may comprise a Lithium containing compound. In one embodiment the lithium containing compound can be a metal chalcogenide of formula $LiMQ_2$, wherein M is at least one metal selected from transition metals such as Co, Ni, Fe, Mn, Cr and V and Q is a chalcogen such as O or S. Among these, it is preferred to use a lithium-based metal oxide of formula $LiMO_2$, wherein M is the same as defined above. Preferred examples thereof may include $LiCoO_2$, $LiNiO_2$, $LiNi_xCo_{1-x}O_2$ ($0<x<1$) and spinel-structured $LiMn_2O_4$.

In another embodiment, still in the case of forming a positive electrode for a Lithium-ion secondary battery, the electro active compound may comprise a lithiated or partially lithiated transition metal oxyanion-based electro-active material of formula $M_1M_2(JO_4)_fE_{1-f}$ wherein $M_1$ is lithium, which may be partially substituted by another alkali metal representing less than 20% of the $M_1$ metals, $M_2$ is a transition metal at the oxidation level of +2 selected from Fe, Mn, Ni or mixtures thereof, which may be partially substituted by one or more additional metals at oxidation levels between +1 and +5 and representing less than 35% of the $M_2$ metals, $JO_4$ is any oxyanion wherein J is either P, S, V, Si, Nb, Mo or a combination thereof, E is a fluoride, hydroxide or chloride anion, f is the molar fraction of the $JO_4$ oxyanion, generally comprised between 0.75 and 1.

The $M_1M_2(JO_4)_fE_{1-f}$ electro-active material as defined above is preferably phosphate-based and may have an ordered or modified olivine structure.

More preferably, the electro active compound in the case of forming a positive electrode has formula $Li_{3-x}M'_yM''_{2-y}(JO_4)_3$ wherein $0\leq x\leq 3$, $0\leq y\leq 2$, M' and M'' are the same or different metals, at least one of which being a transition metal, $JO_4$ is preferably $PO_4$ which may be partially substituted with another oxyanion, wherein J is either S, V, Si, Nb, Mo or a combination thereof. Still more preferably, the electro active compound is a phosphate-based electro-active material of formula $Li(Fe_xMn_{1-x})PO_4$ wherein $1\leq x\leq 1$, wherein x is preferably 1 (that is to say, lithium iron phosphate of formula $LiFePO_4$).

In another embodiment, the electro active compound for a positive electrode is selected from lithium-containing complex metal oxides of general formula (I)

$$LiNi_xM1_yM2_zY_2 \quad (I)$$

wherein M1 and M2 are the same or different from each other and are transition metals selected from Co, Fe, Mn, Cr and V, $0.5\leq x\leq 1$, wherein $y+z=1-x$, and Y denotes a chalcogen, preferably selected from O and S.

The electro active compound in this embodiment is preferably a compound of formula (I) wherein Y is O. In a further preferred embodiment, M1 is Mn and M2 is Co or M1 is Co and M2 is Al.

Examples of such active materials include $LiNi_xMn_yCo_zO_2$, herein after referred to as NMC, and $LiNi_xCo_yAl_zO_2$, herein after referred to as NCA.

Specifically with respect to $LiNi_xMn_yCo_zO_2$, varying the content ratio of manganese, nickel, and cobalt can tune the power and energy performance of a battery.

In a particularly preferred embodiment of the present invention, the compound EA is a compound of formula (I) as above defined, wherein $0.5\leq x\leq 1$, $0.1\leq y\leq 0.5$, and $0\leq z\leq 0.5$.

Non limitative examples of suitable electro active compounds for positive electrode of formula (I) include, notably:

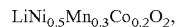

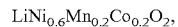

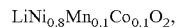

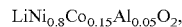

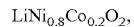

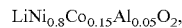

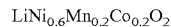

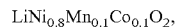

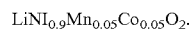

The compounds:

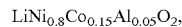

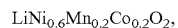

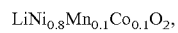

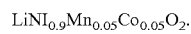

are particularly preferred.

In the case of forming a negative electrode for a Lithium-ion secondary battery, the electro active compounds may preferably comprise one or more carbon-based materials and/or one or more silicon-based materials.

In some embodiments, the carbon-based materials may be selected from graphite, such as natural or artificial graphite, graphene, or carbon black. These materials may be used alone or as a mixture of two or more thereof. The carbon-based material is preferably graphite.

The silicon-based compound may be one or more selected from the group consisting of chlorosilane, alkoxysilane, aminosilane, fluoroalkylsilane, silicon, silicon chloride, silicon carbide and silicon oxide. More particularly, the silicon-based compound may be silicon oxide or silicon carbide.

When present in the electro active compounds, the silicon-based compounds are comprised in an amount ranging from 1 to 60% by weight, preferably from 5 to 20% by weight with respect to the total weight of the electro active compounds.

The Solvent

The electrode forming compositions of the invention comprise one or more solvents. The solvent for an anode forming compositions may comprise and can preferably be water. This allows reducing the overall use of organic solvents with a consequent reduction of costs, reduction of flammable material and reduced environmental impact.

As known to the skilled person, electrode forming compositions for forming cathodes cannot comprise water due to its incompatibility with the cathode electrode active materials. The solvent in cathode forming composition comprises one or more organic solvents, preferably polar solvents, examples of which may include: N-methyl-2-pyrrolidone, N,N-dimethylformamide, N,N-dimethylacetamide, dimethylsulfoxide, hexamethylphosphamide, dioxane, tetrahydrofuran, tetramethylurea, triethyl phosphate, and trimethyl phosphate. These organic solvents may be used singly or in mixture of two or more species.

The electrode forming compositions of the present invention typically comprise from 0.5 wt % to 10 wt %, preferably from 0.8 wt % to 5 wt % of PAI polymer(s), from 0.1 wt % to 5 wt %, preferably from 0.5 wt % to 3 wt % of co-binder(s). The weight ratio between co-binder and binder is 2 or lower, preferably 1 or lower. The composition also comprises from 80 wt % to 99 wt %, of electro active compound(s). All percentages are weight percentages of the total "solids". For "solids" it is intended "all the ingredients of the electrode forming composition of the invention excluding the solvent".

In general in the electrode forming compositions of the present invention the solvent is from 10 wt % to 90 wt % of the total amount of the composition. In particular for anode forming composition the solvent is preferably from 25 wt % to 75 wt %, more preferably from 30 wt % to 60 wt % of the total amount of the composition. For cathode forming compositions the solvent is preferably from 5 wt % to 60 wt %, more preferably from 15 wt % to 40 wt % of the total amount of the composition.

The Optional Conductive Agent

One or more optional conductive agents may be added in order to improve the conductivity of a resulting electrode made from the composition of the present invention. Conducting agents for batteries are known in the art.

Examples thereof may include: carbonaceous materials, such as carbon black, graphite fine powder carbon nanotubes, graphene, or fiber, or fine powder or fibers of metals such as nickel or aluminum. The optional conductive agent is preferably carbon black. Carbon black is available, for example, under the brand names, Super P® or Ketjenblack®.

When present, the conductive agent is different from the carbon-based material described above.

The amount of optional conductive agent is preferably from 0 to 30 wt % of the total solids in the electrode forming composition. In particular for cathode forming compositions the optional conductive agent is typically from 0 wt % to 10 wt %, more preferably from 0 wt % to 5 wt % of the total amount of the solids within the composition.

For anode forming compositions which are free from silicon based electro active compounds the optional conductive agent is typically from 0 wt % to 5 wt %, more preferably from 0 wt % to 2 wt % of the total amount of the solids within the composition, while for anode forming compositions comprising silicon based electro active compounds it has been found to be beneficial to introduce a larger amount of optional conductive agent, typically from 5 to 20 wt % of the total amount of the solids within the composition.

Electrode Manufacturing

The electrode-forming composition of the invention can be used in a process for the manufacture of an electrode said process comprising:
 (i) providing a metal substrate having at least one surface;
 (ii) providing an electrode forming composition according to the present invention;
 (iii) applying the electrode forming composition onto the at least one surface of the metal substrate thereby providing an assembly comprising a metal substrate coated with said electrode forming composition onto the at least one surface;
 (iv) drying the assembly provided in step (iii);
 (v) optionally submitting the dried assembly obtained in step (iv) to a curing step.

The metal substrate is generally a foil, mesh or net made from a metal, such as copper, aluminium, iron, stainless steel, nickel, titanium or silver.

Under step (iii) of the process of the invention, the electrode forming composition is applied onto at least one surface of the metal substrate typically by any suitable procedures such as casting, printing and roll coating.

Optionally, step (iii) may be repeated, typically one or more times, by applying the electrode forming composition provided in step (ii) onto the assembly provided in step (iv).

Curing in step (v) of the process is suitably carried out by submitting the dried assembly obtained in step (iv) to a thermal treatment at a temperature of at least 130° C., preferably of at least 150° C., for at least 30 minutes.

The dried assembly obtained at step (iv) or the cured assembly obtained at step (v) may be further subjected to a compression step, such as a calendaring process, to achieve the target porosity and density of the electrode.

Preferably, the dried assembly obtained at step (iv) or the cured assembly obtained at step (v) is hot pressed, the temperature during the compression step being comprised from 25° C. and 130° C., preferably being of about 90° C.

Preferred target porosity for the obtained electrode is comprised between 15% and 40%, preferably from 25% and 30%. The porosity of the electrode is calculated as the complementary to unity of the ratio between the measured density and the theoretical density of the electrode, wherein:
 the measured density is given by the mass divided by the volume of a circular portion of electrode having diameter equal to 24 mm and a measured thickness; and
 the theoretical density of the electrode is calculated as the sum of the product of the densities of the components of the electrode multiplied by their mass ratio in the electrode formulation.

In a further instance, the present invention pertains to the electrode obtainable by the process of the invention.

Therefore the present invention relates to an electrode comprising:
 a metal substrate, and
 directly adhered onto at least one surface of said metal substrate, at least one layer consisting of a composition comprising:
 (i) one or more aromatic polyamide-imide polymers (PAI) comprising more than 50% by moles of recurring units $R_{PAI}$ each of said $R_{PAI}$ recurring units comprising
  at least one aromatic ring,
  at least one imide group as such or in its amic acid form or as a salt of its amic acid form
  at least one amide group which is not included in the amic acid form of an imide group;
 (ii) one or more electro-active compounds;
 (iii) one or more co-binder materials, being selected among polymers having a Tg below 20° C. and having an enthalpy of fusion from 0 to 90 J/g.

The composition directly adhered onto at least one surface of said metal substrate, corresponds to the electrode forming composition of the invention wherein the solvent has been at least partially removed during the manufacturing process of the electrode, for example in step iii (drying) and/or in the optional curing and compression steps. Therefore all the preferred embodiments described in relation to the electrode forming compositions of the invention are also applicable to the composition directly adhered onto at least one surface of said metal substrate, in electrodes of the invention, except for the solvent removed during the manufacturing process.

The Applicant has surprisingly found that the electrode forming composition of the present invention shows good adhesion of the binder to current collector and to the electro active compounds. In particular the composition of the present invention shows outstanding adhesion to the silicon based electro active compounds, which is maintained even after multiple charge/discharge cycles. As known in the art, PAI based electrode forming compositions have outstanding adhesion on the current collector materials, but they are also relatively rigid and fragile, so that mechanical stresses coming from external causes (e.g. bending of the battery) or internal causes (e.g. volume change of a component of the battery during change/discharge cycles such as for example the silicone based compounds in the anode), may cause battery fault by breakage of detachment of the electrode forming composition, or reduced contact with the silicone based material. Surprisingly the electrode forming compositions of the invention have been found to further improve the outstanding properties of adhesion of PAI to current collector materials and electro active materials, in particular to silicone based compounds in the anode which are particularly difficult to adhere to due to their volume change during battery, so that the resulting electrodes are can resist mechanical stresses without being damaged.

The electrode of the invention is particularly suitable for use in electrochemical devices, in particular in secondary batteries.

For the purpose of the present invention, the term "secondary battery" is intended to denote a rechargeable battery. The secondary battery of the invention is preferably an alkaline or an alkaline-earth secondary battery. The secondary battery of the invention is more preferably a Lithium-ion secondary battery. An electrochemical device according to the present invention can be prepared by standard methods known to a person skilled in the art.

The invention will be now described with reference to the following examples, whose purpose is merely illustrative and not intended to limit the scope of the invention.

Should the disclosure of any patents, patent applications, and publications which are incorporated herein by reference conflict with the description of the present application to the extent that it may render a term unclear, the present description shall take precedence.

EXPERIMENTAL PART

Raw Materials

The following raw materials were used in the examples below:
PAI polymer aqueous solution (5.00% wt), prepared as described below
Trimellitic acid chloride (TMAC), oxydianiline (ODA) available from Aldrich;
N-methylpyrrolidone (NMP) available from VWR International or Sigma Aldrich;
Lithium carbonate available from Sigma-Aldrich;
Silicon oxide, KSC-1064 from Shin-Etsu, theoretical capacity is about 2100 mAh/g;
Carbon black, SC45 from Imerys S. A;
Graphite, ACTILION 2 from Imerys.
Carboxymethylcellulose (CMC), MAC 350 HC from Nippon Paper;
Styrene-Butadiene Rubber (SBR) suspension (38 wt. % in water), Zeon® BM-480B from ZEON Corporation;
Fluoroelastomer: copolymer VDF 60% mol TFE 20% mol HFP 20% mol aqueous dispersion (30.4% wt) of particles having an average particle size of 400 nanometers measured by Dynamic Light scattering according to ISO 22412 from Solvay Specialty Polymers Italy, having a weight average molecular weight of about 500.000 and a polydispersity of about 4 measured via GPC;
Ethylene carbonate:dimethyl carbonate=1:1 in weight percent: Selectilyte™ LP 30 from BASF;
Fluoroethylene carbonate (F1EC) from Sigma Aldrich
Vinylene carbonate from Sigma Aldrich.

Preparation of PAI Polymer 5 wt % Aqueous Solution

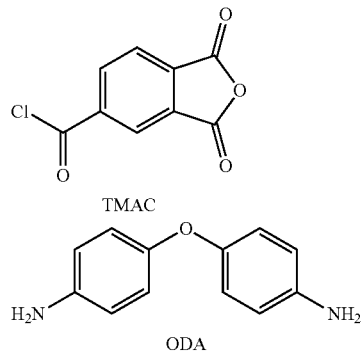

TMAC

ODA

ODA monomer (60.0 g, 0.3 moles) was charged into a 4-neck jacketed round-bottom flask fitted with overhead mechanical stirrer. NMP (250 mL) was charged to the flask and the mixture was cooled to 10° C. with mild agitation under a nitrogen atmosphere. The flask was fitted with a heated addition funnel to which TMAC (64.0 g, 0.3 moles) was charged and heated to a minimum of 100° C. The molten TMAC was added to the solution of diamine in NMP at a rate sufficient not to exceed 40° C. with vigorous agitation. Once the addition was complete, external heating was applied to maintain 35-40° C. for 2 hours. Additional NMP (50 mL) was added and the reaction mixture discharged into a 500 mL beaker. The polymer solution was slowly added to water (4000 mL) in a stainless steel high-shear mixer. The precipitated polymer (PAI resin) was filtered and washed multiple times with water to remove residual solvent and acid by-product resulting in a slurry/wet cake at 20.7% solids. Degree of imidization, as measured by acid number titration was no higher than 50 mol. %.

Deionized water (175-250 mL) was charged to a 4-neck jacketed round-bottom flask fitted with overhead mechanical stirrer. The required amount of lithium carbonate was added and the solution heated to 70° C. With vigorous agitation, the PAI resin obtained above (60.5 g at 20.7% solids) was added in step-wise fashion, allowing each portion to dissolve prior to further addition. After the entire polymer was charged to the reactor, heating was continued for 1-2 hours, at which time the homogenous solution was discharged. Solutions were further diluted down to 5 wt % in water.

Preparation of Electrode-Forming Compositions and Negative Electrodes

Electrode-forming compositions and negative electrodes were prepared as detailed below using the following equipment:
Mechanical mixer: planetary mixer (Speedmixer) and high shear mechanical mixer of the Dispermat® series with flat PTFE lightweight dispersion impeller;
Film coater/doctor blade: Elcometer® 4340 motorised/automatic film applicator;
Vacuum oven: BINDER APT line VD 53 with vacuum; and
Roll press: precision 4" hot rolling press/calender up to 100° C.

Example For Preparation of Negative Electrode Including PAI Resin and SBR

An aqueous composition was prepared by mixing 40.00 g of a 5.00 wt. % solution of PAI resin in water, 11.18 g of deionized water, 7.05 g of silicon oxide, 39.95 g of graphite, and 0.50 g of carbon black. The mixture was homogenized by moderate stirring in planetary mixer for 10 min and then mixed again in a high shear mixer at 800 rpm for 1 h. 1.32 g of SBR dispersion was added to the mixture and then mixed again at 800 rpm for 1 h thus obtaining an electrode forming composition.

The electrode forming composition was then coated on a 18.5 μm thick copper foil with a doctor blade and dried in an oven at temperature of 60° C. for about 60 minutes. The thickness of the dried coating layer was about 64 μm. The dried sheet was then hot pressed at 60° C. in a roll press to achieve target loading of 1.5 g/cc. The resulting negative electrode sheet had the following composition: 14.1 wt. % of silicon oxide, 79.9 wt % of graphite, 4 wt. % of PAI, 1 wt % of SBR and 1 wt % of carbon black. Electrodes E1, were cut in a rectangular shape of 20 mm×150 mm from the electrode sheet prepared as described.

Example For Preparation of Negative Electrode Including PAI Resin and Fluoroelastomer An aqueous composition was prepared by mixing 40.00 g of a 5.00 wt. % solution of a PAI resin, in water, 10.86 g of deionized water, 7.05 g of silicon oxide, 39.95 g of graphite and 0.50 g of carbon black. The mixture was homogenized by moderate stirring in planetary mixer for 10 min and then mixed again in a high shear mixer at 800 rpm for 1 h. 1.64 g of fluoroelastomer suspension in was added to the mixture and then mixed again at 800 rpm for 1 h thus obtaining an electrode forming composition.

The electrode forming composition was then coated on a 18.5 μm thick copper foil with a doctor blade and dried in an oven at temperature of 60° C. for about 60 minutes. The thickness of the dried coating layer was about 65 μm. The dried sheet was then hot pressed at 60° C. in a roll press to achieve target loading of 1.5 g/cc. The resulting negative electrode sheet had the following composition: 14.1 wt. % of silicon oxide, 79.9 wt % of graphite, 4 wt. % of PAI, 1 wt % of fluoroelastomer and 1 wt % of carbon black.

Electrodes E2, were cut in a rectangular shape of 20 mm×150 mm from the electrode sheet prepared as described.

Comparative Example 1: Negative Electrode Including PAI, without Co-Binder

An aqueous composition was prepared by mixing 50.00 g of a 5.00 wt. % solution of PAI in 2.50 g of deionized water, 7.05 g of silicon oxide, 39.95 g of graphite, and 0.50 g of carbon black.

The mixture was homogenized by moderate stirring in a planetary mixer for 10 min and then mixed again in a high shear mixer at 800 rpm for 2 h thus obtaining an electrode forming composition.

The electrode forming composition was then coated on a 18.5 μm thick copper foil with a doctor blade and dried in an oven at temperature of 60° C. for about 60 minutes. The thickness of the dried coating layer was about 61 μm. The dried sheet was then hot pressed at 60° C. in a roll press to achieve target loading of 1.5 g/cc. The resulting negative electrode sheet had the following composition: 14.1 wt. % of silicon oxide, 79.9 wt % of graphite, 5 wt. % of PAI, and 1 wt % of carbon black.

Electrodes C1, were cut in a rectangular shape of 20 mm×150 mm from the electrode sheet prepared as described.

Adhesion Properties Measurement on the Negative Electrodes

Peeling tests were performed on electrode (E1), electrode (E2), electrode (C1), by following the standard ASTM D903 at a speed of 300 mm/min at 20° C. in order to evaluate the adhesion of the electrode composition coating on the metal foil.

The results are shown in Table 1.

The results surprisingly show that electrodes (E1) and (E2) according to the present invention shows higher adhesion than electrode (C1).

| Electrode | Adhesion (N/m) |
|---|---|
| E1 | 39.3 |
| E2 | 20.2 |
| C1 | 12.2 |

The invention claimed is:

1. An electrode-forming composition comprising:
   (i) from 0.5 wt % to 10 wt % of one or more aromatic polyamide-imide (PAI) polymers comprising more than 50% by moles of recurring units ($R_{PAI}$) each of said $R_{PAI}$ recurring units comprising
       at least one aromatic ring,
       at least one imide group as such or in its amic acid form or as a salt of its amic acid form
       at least one amide group which is not included in the amic acid form of an imide group;
   (ii) from 80 wt % to 99 wt % one or more electro-active compounds;
   (iii) one or more solvents; and
   (iv) from 0.1 wt % to 5 wt % of one or more co-binder materials, being selected among fluoroelastomers and SBR rubbers having a Tg below 30° C. and having an enthalpy of fusion from 0 to 90 J/g,
   wherein the weight ratio between co-binder and binder is 2 or lower, and wherein all percentages are weight percentages of the total "solids" in the electrode forming composition.

2. The electrode forming composition according to claim 1, wherein said $R_{PAI}$ recurring units are selected from the group consisting of units having the following general formulae:

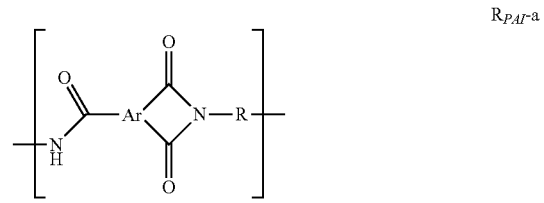

$R_{PAI}$-a

-continued

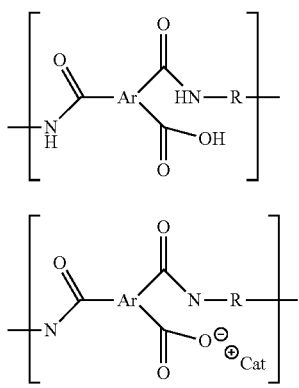

$R_{PAr}$-b

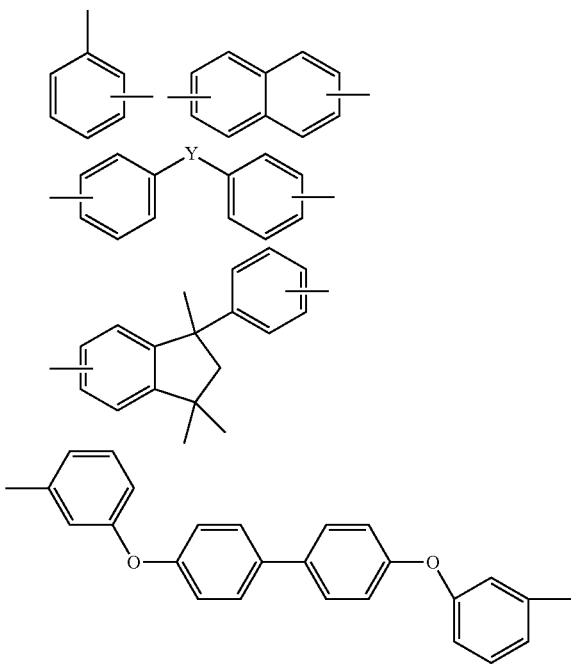

$R_{PAr}$-c wherein:
Ar is a trivalent aromatic group;
R is a divalent aromatic group selected from the group consisting of the following structures:

and corresponding optionally substituted structures wherein Y is selected from the group consisting of —O—, —S—, —SO$_2$—, —CH$_2$—, —C(O)—, —C(CF$_3$)$_2$—, —(CF$_2$)$_p$—, "p" being an integer from 0 to 5, and
"Cat+" is a cation.

3. The electrode forming composition according to claim 2 wherein said composition is an anode forming composition and wherein $R_{PAr}$-a units represent 0-50%, $R_{PAr}$-b units represent 0-50%, and $R_{PAr}$-c units represent 50-100%, in moles of the total $R_{PAr}$ recurring units.

4. The electrode forming composition according to claim 2 wherein said composition is a cathode forming composition, and wherein $R_{PAr}$-a units represent 50-100%, $R_{PAr}$-b units represent 0-50%, and $R_{PAr}$-c units represent 0-50%, in moles of the total $R_{PAr}$ recurring units.

5. The electrode forming composition according to claim 1 wherein the composition is an anode forming composition, wherein said one or more solvents comprise water, and wherein said one or more electro-active compounds comprise a carbon based material and/or a silicon based material.

6. The electrode forming composition according to claim 1 wherein said one or more co binder materials comprises a fluoroelastomer which is a copolymer of VDF, TFE and HFP.

7. A process for the manufacture an electrode, said process comprising:
(i) providing a metal substrate having at least one surface;
(ii) providing an electrode forming composition according claim 1;
(iii) applying said electrode forming composition onto said at least one surface of the metal substrate provided in step (i), thereby providing an assembly comprising a metal substrate coated onto at least one surface with said electrode forming composition;
(iv) drying the assembly provided in step (iii);
(v) optionally submitting the dried assembly obtained in step (iv) to a curing step.

8. The process according to claim 7, wherein, under step (iii), the electrode forming composition is applied onto said metal substrate by casting, printing or roll coating.

9. An electrode formed by the process according to claim 7 said electrode comprising:
a metal substrate, and
directly adhered onto at least one surface of said metal substrate, at least one layer consisting of a composition comprising:
(i) one or more aromatic polyamide-imide polymers (PAI) comprising more than 50% by moles of recurring units $R_{PAI}$ each of said $R_{PAI}$ recurring units comprising
at least one aromatic ring,
at least one imide group as such or in its amic acid form or as a salt of its amic acid form
at least one amide group which is not included in the amic acid form of an imide group;
(ii) one or more electro-active compounds;
(iii) one or more co-binder materials, being selected among polymers having a Tg below 20° C. and having an enthalpy of fusion from 0 to 90 J/g.

10. The electrode according to claim 9 wherein the electro active compound comprises a carbon-based material and/or a silicon-based material, and the electrode is a negative electrode.

11. The electrode according to claim 9 wherein the electro active compound comprises a lithium containing compound and the electrode is a positive electrode.

12. An electrochemical device comprising the electrode according to claim 9.

13. An electrochemical device according to claim 12, said electrochemical device being a secondary battery comprising:
a positive electrode and a negative electrode,
wherein at least one of the positive electrode and the negative electrode is the electrode.

* * * * *